(12) United States Patent
Lee

(10) Patent No.: US 8,722,217 B2
(45) Date of Patent: May 13, 2014

(54) BATTERY PACK AND METHOD OF MANUFACTURING BATTERY PACK

(75) Inventor: Sangjoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 164 days.

(21) Appl. No.: 12/846,751

(22) Filed: Jul. 29, 2010

(65) Prior Publication Data
US 2011/0086242 A1    Apr. 14, 2011

(30) Foreign Application Priority Data

Oct. 9, 2009   (KR) .................... 10-2009-0096107

(51) Int. Cl.
*H01M 14/00* (2006.01)
*B23K 9/00* (2006.01)

(52) U.S. Cl.
USPC ............... 429/7; 429/62; 429/90; 429/176

(58) Field of Classification Search
USPC ............ 429/7, 62, 176, 181, 185, 178
See application file for complete search history.

(56) References Cited

U.S. PATENT DOCUMENTS

| | | | |
|---|---|---|---|
| 6,893,753 B2* | 5/2005 | Iwaizono et al. ............... 429/7 |
| 7,879,477 B2* | 2/2011 | Seo et al. ..................... 429/61 |
| 8,343,651 B2* | 1/2013 | Park et al. .................. 429/151 |
| 8,349,488 B2* | 1/2013 | Seo et al. ................... 429/181 |
| 8,354,179 B2* | 1/2013 | Kwag et al. .................... 429/7 |
| 8,361,645 B2* | 1/2013 | Kim ............................ 429/158 |
| 2001/0026888 A1* | 10/2001 | Yokoyama et al. ........... 429/121 |
| 2004/0060169 A1* | 4/2004 | Yokoyama et al. .......... 29/623.1 |
| 2004/0234848 A1 | 11/2004 | Chung et al. |
| 2005/0014036 A1 | 1/2005 | Kim |
| 2006/0019156 A1* | 1/2006 | Kim .............................. 429/161 |
| 2006/0051668 A1 | 3/2006 | Chung et al. |
| 2006/0105237 A1 | 5/2006 | Oh |
| 2006/0214632 A1 | 9/2006 | Lee et al. |
| 2007/0026302 A1* | 2/2007 | Yoon ............................ 429/129 |
| 2007/0105016 A1* | 5/2007 | Chang et al. ................. 429/174 |
| 2007/0154785 A1* | 7/2007 | Seo et al. ....................... 429/61 |
| 2009/0154048 A1 | 6/2009 | Jang et al. |
| 2009/0176156 A1* | 7/2009 | Lee .............................. 429/178 |

(Continued)

FOREIGN PATENT DOCUMENTS

CN       1838473 A    9/2006
CN     101465413 A    6/2009

(Continued)

OTHER PUBLICATIONS

Patent Abstracts of Japan and English Machine translation of Japanese Publication No. 2002-251986 listed above, 8 pages.

(Continued)

*Primary Examiner* — Joseph S Del Sole
*Assistant Examiner* — Nahida Sultana
(74) *Attorney, Agent, or Firm* — Christie, Parker & Hale, LLP

(57) ABSTRACT

A battery pack includes a battery cell including a case and at least one cell tab, the case including a lip, the cell tab protruding through the lip, and a protective circuit module including a circuit board located at a top side of the lip, at least one electrode tab located on the circuit board, and at least one circuit device located at the circuit board, and the at least one cell tab is connected to the at least one electrode tab.

13 Claims, 8 Drawing Sheets

(56) References Cited

U.S. PATENT DOCUMENTS

| | | | |
|---|---|---|---|
| 2010/0092861 A1* | 4/2010 | Kim | 429/178 |
| 2010/0151282 A1* | 6/2010 | Koh et al. | 429/7 |
| 2010/0291413 A1* | 11/2010 | Seo et al. | 429/7 |
| 2011/0003196 A1* | 1/2011 | Kim | 429/179 |
| 2011/0052941 A1* | 3/2011 | Jang et al. | 429/7 |
| 2011/0097608 A1* | 4/2011 | Park et al. | 429/7 |
| 2011/0195282 A1* | 8/2011 | Lee | 429/7 |
| 2012/0015217 A1 | 1/2012 | Lee et al. | |
| 2012/0021256 A1* | 1/2012 | Jang | 429/7 |
| 2012/0070697 A1* | 3/2012 | Baek et al. | 429/7 |
| 2012/0121945 A1* | 5/2012 | Kim | 429/7 |
| 2012/0231324 A1* | 9/2012 | Brisbane | 429/152 |
| 2012/0295151 A1* | 11/2012 | Takami et al. | 429/158 |
| 2012/0321919 A1* | 12/2012 | Schaefer et al. | 429/50 |
| 2012/0328930 A1* | 12/2012 | Inagaki et al. | 429/163 |

FOREIGN PATENT DOCUMENTS

| | | |
|---|---|---|
| CN | 101478034 A | 7/2009 |
| JP | 2002-208788 | 7/2002 |
| JP | 2002-251986 A | 9/2002 |
| JP | 2004-349243 | 12/2004 |
| JP | 2005-019404 | 1/2005 |
| JP | 2006-278333 | 10/2006 |
| KR | 10-2006-0118961 A | 11/2006 |
| KR | 10-2007-0067781 A | 6/2007 |
| KR | 10-2007-0081559 A | 8/2007 |
| KR | 10-0879895 B1 | 1/2009 |

OTHER PUBLICATIONS

Korean Patent Abstracts, Publication No. 1020080003473 A, dated Jan. 8, 2008, in the name of You et al., which corresponds to Korean Patent KR 10-087985 B1 listed above, 1 page.

KIPO Office action dated Sep. 22, 2011, for Korean application No. 10-2009-0096107, 5 pps., listing reference KR 100930473 B1, which corresponds to publication No. KR 2007-0081559 A, listed above.

Extended European Search Report dated Feb. 4, 2011 in corresponding European application No. EP 10251708.3, 6 pps.

Japanese Office action dated Jul. 31, 2012, for corresponding Japanese Patent application 2010-131515, (2 pages).

Patent Abstracts of Japan, and English machine translation of Japanese Publication 2002-208788 listed above, (14 pages).

SIPO Office action dated Jan. 29, 2013, for corresponding Chinese Patent application 201010501860.5, with English translation, (29 pages).

SIPO Office Action dated Jul. 19, 2013, for corresponding Chinese Patent Application No. 201010501860.5, with English translation, (22 pages).

* cited by examiner

BATTERY PACK AND METHOD OF MANUFACTURING BATTERY PACK

CROSS-REFERENCE TO RELATED APPLICATION

This application claims priority to and the benefit of Korean Patent Application No. 10-2009-0096107, filed in the Korean Intellectual Property Office on Oct. 9, 2009, the entire content of which is incorporated herein by reference.

BACKGROUND

1. Field

Embodiments of the present invention relate to a battery pack and a method of manufacturing the battery pack.

2. Description of Related Art

Generally, a battery pack includes a rechargeable battery cell and a protective circuit module configured to prevent overcharging or over-discharging of the battery cell. Recent battery cells are usually lithium ion secondary batteries or lithium ion polymer batteries. The protective circuit module includes a plurality of circuit devices configured to prevent overcharging or over-discharging.

Lithium ion polymer batteries can be classified into solid-type lithium ion polymer batteries that do not include organic electrolyte, and gel-type lithium ion polymer batteries that include organic polymer electrolyte.

As compared with lithium ion batteries using liquid electrolyte, lithium ion polymer batteries leak electrolyte less often or not at all. Therefore, lithium ion polymer batteries may be used with a pouch made of a metal foil and an insulating layer instead of a metal can.

SUMMARY

Embodiments of the present invention are directed to a battery pack and a method of manufacturing the battery pack.

One embodiment of the present invention provides a battery pack configured to reduce or minimize the thickness of a protective circuit module and a method of manufacturing the battery pack.

Another embodiment of the present invention provides a battery pack configured to prevent a case from being damaged by an electrode tab and a method of manufacturing the battery pack.

Another embodiment of the present invention provides a battery pack configured to easily connect a cell tab to an electrode tab and a method of manufacturing the battery pack.

One embodiment of the present invention provides a battery pack including: a battery cell including a case and at least one cell tab, the case including a lip, the at least one cell tab protruding through the lip; and a protective circuit module including a circuit board located at a top side of the lip, at least one electrode tab located at the circuit board, and at least one circuit device located at the circuit board, wherein the at least one cell tab is connected to the electrode tab.

The circuit board may have at least one hole, and the at least one electrode tab may cover at least a portion of the at least one hole. The at least one electrode tab may have a width greater than that of the at least one hole.

The at least one electrode tab may have a width less than or equal to that of the circuit board.

The at least one electrode tab and the at least one circuit device may be located at a top surface of the circuit board.

The at least one electrode tab may have a planar plate shape.

The at least one electrode tab may include: a first section connected to the circuit board; a second section perpendicularly connected to the first section; and a third section connected to the second section and substantially parallel with the first section. The at least one cell tab may be located between the first section and the third section of the at least one electrode tab.

The circuit board may have at least one cutout groove at a position corresponding to a location of the at least one cell tab.

A bottom surface of the lip may be coplanar with a bottom surface of the case, and a top surface of the lip may be closer to a plane of the bottom of the lip and the bottom surface of the case than a top surface of the case.

The battery pack may further include a first insulating tape located between the lip and the circuit board. Both lateral sides of the battery cell and the protective circuit module may be covered with second insulating tapes. At least a portion of the top sides of the battery cell and the protective circuit module may be covered with a third insulating tape.

In another embodiment of the present invention, a method of manufacturing a battery pack includes: preparing a battery cell including a case and at least one cell tab, and a protective circuit module including a circuit board in which at least one hole is formed and at least one electrode tab covering at least a portion of the hole, and the case includes a lip, and the at least one cell tab protrudes through the lip; connecting the at least one electrode tab and the at least one cell tab; and bending the at least one cell tab so that the protective circuit module is located at a top side of the lip.

The connecting of the electrode tab and the at least one cell tab may include: concurrently bringing a first welding rod into contact with the at least one electrode tab exposed through the at least one hole and a second welding rod into contact with the at least one cell tab; and applying different voltages to the first welding rod and the second welding rod.

In the preparing of the battery cell and the protective circuit module, a first insulating tape may be attached to the top side of the lip of the battery cell.

In another embodiment of the present invention, when the at least one electrode tab includes: a first section connected to the circuit board; a second section perpendicularly connected to the first section; and a third section connected to the second section and substantially parallel with the first section, the connecting of the at least one electrode tab and the at least one cell tab may also include: concurrently bringing a first welding rod into contact with the first section of the at least one electrode tab exposed through the hole and a second welding rod into contact with the third section of the at least one electrode tab; and applying different voltages to the first welding rod and the second welding rod.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
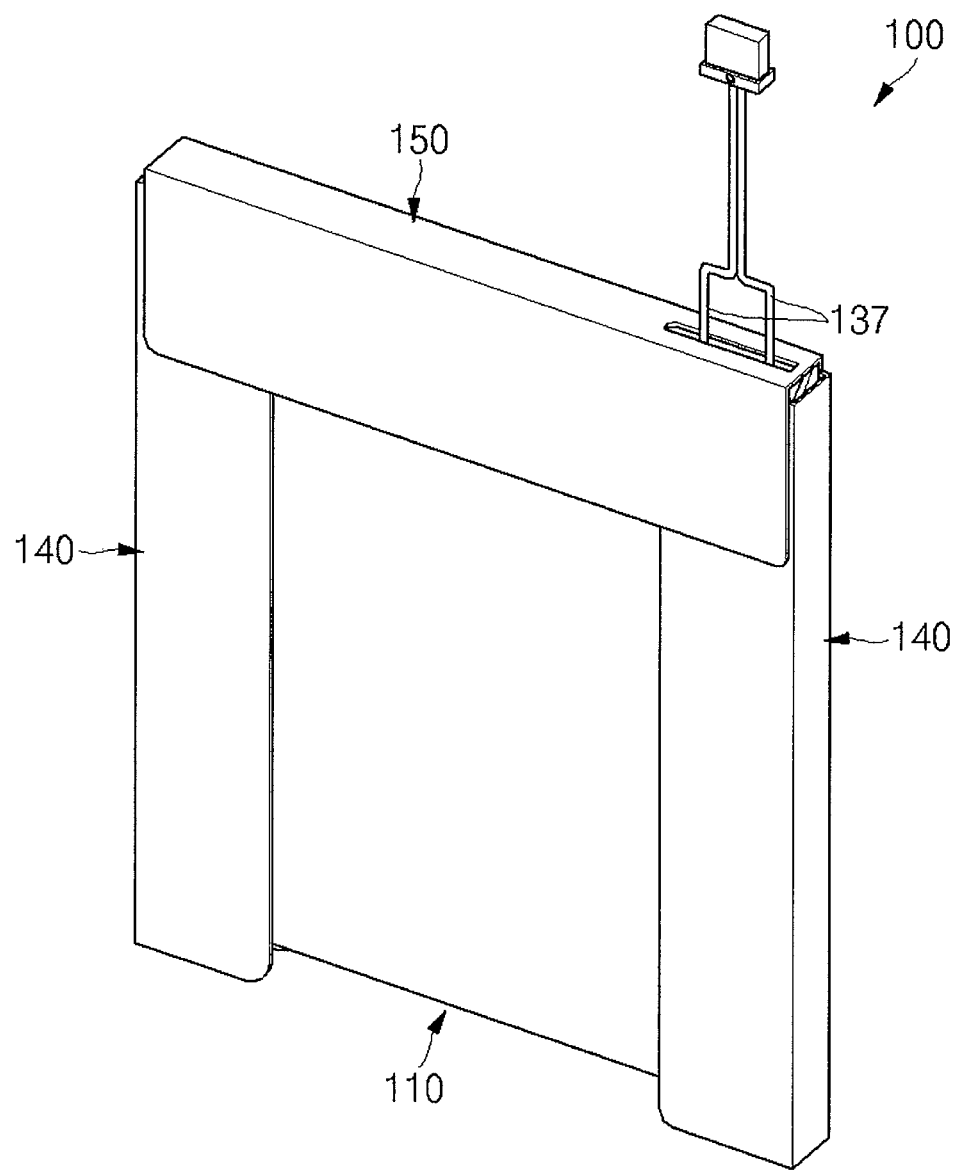
FIG. 1 is a perspective view of a battery pack according to an embodiment of the present invention.

In the following detailed description, only certain exemplary embodiments of the present invention have been shown and described simply by way of illustration. As those skilled in the art would realize, the described embodiments may be modified in various ways, all without departing from the spirit or scope of the present invention. Accordingly, the drawings and description are to be regarded as illustrative in nature and not restrictive. Like reference numerals designate like elements throughout the specification.

Figure 2:
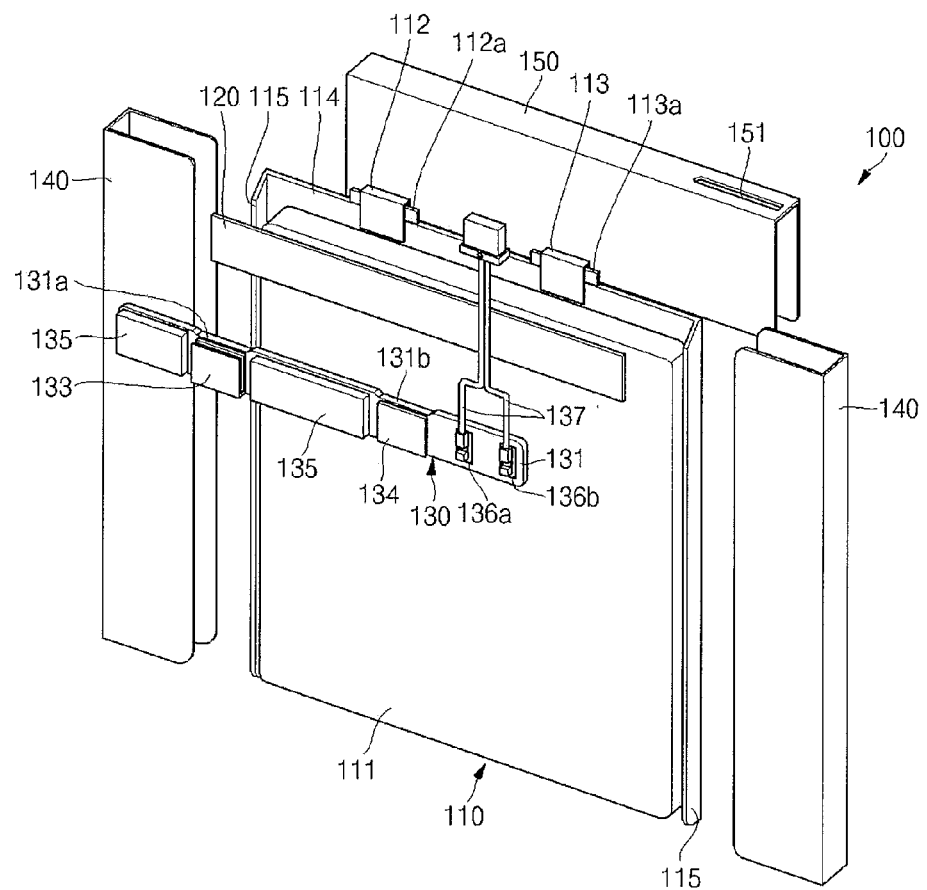
FIG. 2 is an exploded perspective view of a battery pack according to an embodiment of the present invention.

FIG. 1 is a perspective view illustrating a battery pack 100, and FIG. 2 is an exploded perspective view illustrating the battery pack 100 according to an embodiment of the present invention.

Referring to FIGS. 1 and 2, the battery pack 100 includes a battery cell 110, a first insulating tape 120, a protective circuit module 130, second insulating tapes 140, and a third insulating tape 150.

The battery cell 110 may be a typical lithium ion polymer battery. That is, the battery cell 110 includes a pouch case 111, and a positive electrode cell tab 112 and a negative electrode cell tab 113 that extend outwardly through the pouch case 111 (e.g., by a predetermined length). The case 111 includes a lip (or terrace) 114 extending outwardly (e.g., by a predetermined length), and bent parts 115 which are bent after extending from both sides of the case 111 (e.g., by a predetermined length). The positive electrode cell tab 112 and the negative electrode cell tab 113 extend outward through the lip 114 (e.g., by a predetermined length). In addition, the positive electrode cell tab 112 and the negative electrode cell tab 113 are wrapped in insulating tapes 112a and 113a so as not to be electrically shorted with the lip 114. The positive electrode cell tab 112 may be formed of aluminum and the negative electrode cell tab 113 may be formed of nickel; however, the present invention is not limited thereto.

The first insulating tape 120 is located at the lip 114. An adhesive layer may be formed on a side of an insulating layer of the first insulating tape 120 that faces the lip 114, and/or an adhesive layer may be formed on the other side of the insulating layer of the first insulating tape 120 that faces the protective circuit module 130. In this way, the first insulating tape 120 prevents an electrical short circuit between the protective circuit module 130 and the case 111. In addition, the first insulating tape 120 may attach the protective circuit module 130 to the lip 114.

The protective circuit module 130 includes a circuit board 131, a positive electrode tab 133, a negative electrode tab 134, a circuit device 135, a positive terminal 136a, a negative terminal 136b, and a power line 137. The positive electrode tab 133 and the negative electrode tab 134 are located at the circuit board 131. The circuit board 131 has a generally rectangular shape and is located at the first insulating tape 120. The circuit board 131 may include cutout grooves 131a and 131b having a depth (e.g., predetermined depth) and located in sections corresponding to sections (bent sections) where the positive electrode tab 133 and the negative electrode tab 134 are located. Because of the cutout grooves 131a and 131b, the positive electrode tab 133 and the negative electrode tab 134 do not excessively protrude from the circuit board 131. In addition, the width of the positive electrode tab 133 and the negative electrode tab 134 are less than or equal to the width of the circuit board 131. The positive electrode tab 133 and the negative electrode tab 134 may have a rectangular planar plate shape; however, the present invention is not limited thereto. Both the positive electrode tab 133 and the negative electrode tab 134 may be formed of nickel; however, the present invention is not limited thereto. In addition, the circuit device 135 may be located next to the positive electrode tab 133 and the negative electrode tab 134; however, the present invention is not limited thereto. The circuit device 135 is configured to prevent overcharging, over-discharging, and overcurrent of the battery cell 110. The positive terminal 136a and the negative terminal 136b may be located next to the negative electrode tab 134; however, the present invention is not limited thereto. The power line 137 is connected to the positive electrode tab 133 and the negative electrode tab 134, respectively. The power line 137 may be connected to an external set (e.g., a cellular phone, a portable multimedia player (PMP), or a digital multimedia broadcasting (DMB)) or a battery charger.

The second insulating tapes 140 cover both lateral surfaces of the protective circuit module 130 and the case 111. The second insulating tapes 140 are wider than both lateral surfaces of the case 111. Therefore, the second insulating tapes 140 cover both lateral surfaces, sections of the front side of the case 111, which is wider than the lateral side, and sections of the rear side of the case 111, which is wide than the lateral side. The second insulating tapes 140 make the battery cell 110 more compact and protect the battery cell 110 from impacts.

The third insulating tape 150 covers at least one surface of the protective circuit module 130 and portions of the case 111. The third insulating tape 150 is wider than the upper side of the case 111. Therefore, the third insulating tape 150 covers sections of the front side and sections of the rear side of the protective circuit module 130 and the case 111. The third insulating tape 150 makes the battery cell 110 more compact and protects the battery cell 110 from impacts. In addition, the third insulating tape 150 covers sections of the second insulating tapes 140. Alternatively, the second insulating tapes 140 may cover sections of the third insulating tape 150. Furthermore, the third insulating tape 150 completely covers the protective circuit module 130 except for the power line 137 so as to prevent a short circuit of the protective circuit module 130 with an external device. A hole 151 may be formed through the third insulating tape 150 so that the power line 137 can pass through the third insulating tape 150.

Figure 3:
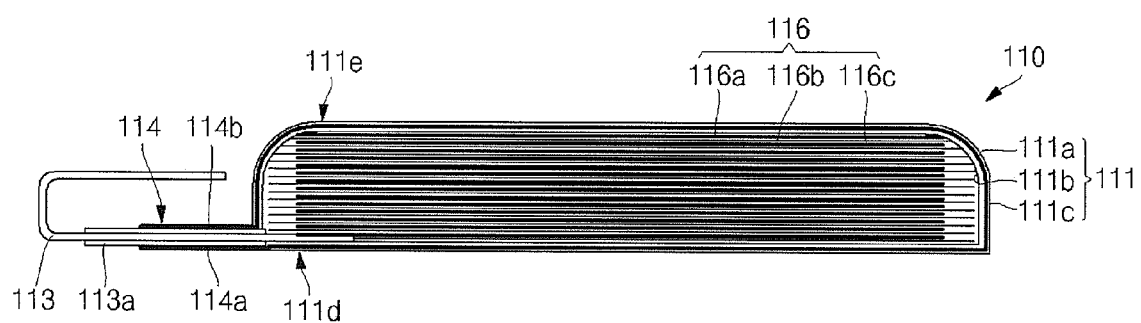
FIG. 3 is a sectional view of a battery cell of a battery pack according to an embodiment of the present invention.

FIG. 3 is a sectional view illustrating the battery cell 110 of the battery pack 100 according to one embodiment.

As shown in FIG. 3, the battery cell 110 further includes an electrode assembly 116 enclosed by the case 111. The electrode assembly 116 stores and outputs energy. The electrode assembly 116 includes a positive electrode plate 116a, a separator 116b, and a negative electrode plate 116c. For example, the positive electrode plate 116a may be formed by coating both sides of an aluminum foil with a positive electrode active material (lithium metal oxide), and the negative electrode plate 116c may be formed by coating both sides of a copper foil with a negative electrode active material (carbon). However, materials that can be used for forming the positive electrode plate 116a and the negative electrode plate 116c are not limited to the above-listed materials. The separator 116b may be formed of porous polypropylene (PP) or porous polyethylene (PE) for free movement of lithium ions between the positive electrode plate 116a and the negative electrode plate 116c. However, a material that can be used for forming the separator 116b is not limited thereto. The electrode assembly 116 may be contained in the case 111 together with electrolyte (not shown).

The positive electrode plate 116a and the negative electrode plate 116c are connected to the positive electrode cell tab 112 and the negative electrode cell tab 113, respectively. In FIG. 3, only the negative electrode cell tab 113 is illustrated for conciseness. As shown in FIG. 3, the negative electrode cell tab 113 extends outward through the lip 114 of the case 111 (e.g., by a predetermined length). In addition, the insulating tape 113a is wound around the negative electrode cell tab 113. The insulating tape 113a also extends outward through the lip 114 (e.g., by a predetermined length). Therefore, because of the insulating tape 113a, an electrical short circuit can be prevented between the negative electrode cell tab 113 and the case 111.

Although not shown in FIG. 3, the positive electrode cell tab 112 also extends outward through the lip 114 of the case 111 (e.g., by a predetermined length). In addition, the insulating tape 112a is wound around the positive electrode cell tab 112. The insulating tape 112a also extends outward through the lip 114 (e.g., by a predetermined length). Therefore, the insulating tape 112a prevents an electrical short circuit between the positive electrode cell tab 113 and the case 111.

The case 111 having a pouch shape may be formed by forming insulating layers 111b and 111c on the bottom and top surfaces of a metal foil 111a. The metal foil 111a may be one or more of, but not limited to, aluminum, stainless steel, or an equivalent thereof. The insulating layer 111b may be located at the bottom surface of the metal foil 111a and may be, but is not limited to, chlorinated polypropylene (CPP) or an equivalent thereof, and the insulating layer 111c may be located at the top surface of the metal foil 111a and may be one or more of, but not limited to, nylon, polyethylene terephthalate (PET), or an equivalent thereof. However, materials that can be used for forming the metal foil 111a, the insulating layer 111b, and the insulating layer 111c are not limited to the above listed materials.

The lip 114 may have a bottom surface 114a located on the same plane as a bottom surface 111d of the case 111 enclosing the electrode assembly 116. In addition, the lip 114 may have a top surface 114b closer to the plane of the bottom surface of the case 111d and the bottom surface of the lip 114a than a top surface 111e of the case 111 enclosing the electrode assembly 116. In this way, a sufficient space is provided on the lip 114 for accommodating the protective circuit module 130.

In FIG. 3, the negative electrode cell tab 113 is shown as having a bent shape. However, the shape of the negative electrode cell tab 113 is not limited thereto.

Figure 4A:
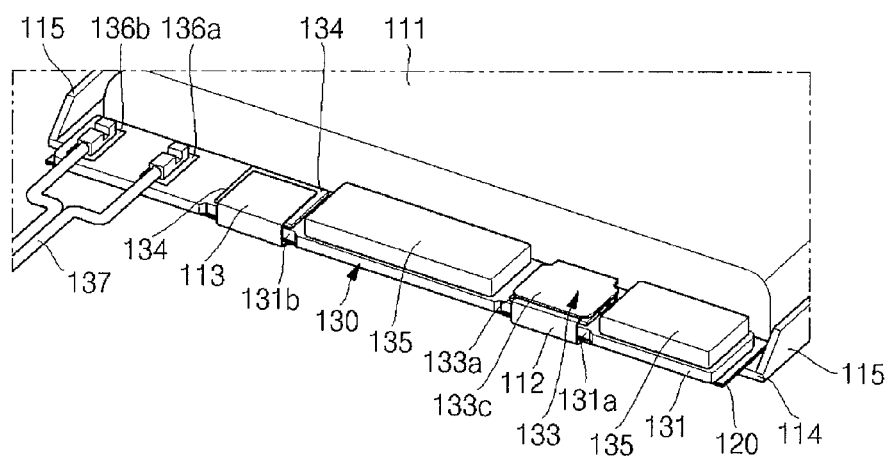
FIGS. 4a and 4b are a partial perspective view and a front view, respectively, of the battery pack according to embodiments of the present invention.
Figure 4B:
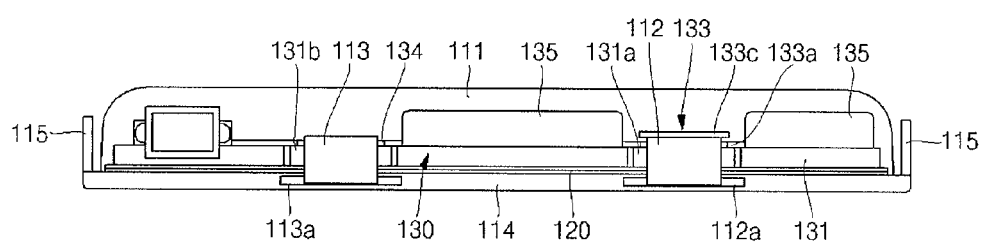

FIGS. 4a and 4b are a partial perspective view and a front view, respectively, of the battery pack 100 according to embodiments of the present invention.

Referring to FIGS. 4a and 4b, the protective circuit module 130 is located at the top surface of the lip 114 of the case 111. In addition, the first insulating tape 120 is located between the protective circuit module 130 and the lip 114. The widths of the protective circuit module 130 and the first insulating tape 120 may be greater than the width of the lip 114.

The negative electrode tab 134 located at the circuit board 131 may have a rectangular planar shape as described above. In addition, the negative electrode cell tab 113 may be connected to the top surface of the negative electrode tab 134. In detail, the negative electrode cell tab 113 may be bent from the lip 114 in a generally ⊂-shape (or C-shape), and then the end of the negative electrode cell tab 113 may be connected to the negative electrode tab 134.

Similarly, the positive electrode tab 133 may have a generally rectangular shape. The positive electrode tab 133 may include a first section 133a attached to the circuit board 131; a second section 133b (refer to FIG. 5a) connected to the first section 133a in a generally perpendicular direction; and a third section 133c connected to the second section 133b and generally parallel with the first section 133a. In addition, the positive electrode cell tab 112 may be connected to the positive electrode tab 133. The positive electrode cell tab 112 may be bent from the lip 114 in a generally ⊂-shape (or C-shape), and then the end of the positive electrode cell tab 112 may be inserted between and connected to the first section 133a and the third section 133c of the positive electrode tab 133.

In addition, as described above, the cutout grooves 131a and 131b having depths (e.g., predetermined depths) may be formed respectively at positions of the circuit board 131 where the positive electrode cell tab 112 and the negative electrode cell tab 113 are bent. The depths of the cutout grooves 131a and 131b may be greater than the thickness of the positive electrode cell tab 112 or the negative electrode cell tab 113; however, the present invention is not limited thereto. Because of the cutout grooves 131a and 131b, the positive electrode cell tab 112 and the negative electrode cell tab 113 do not excessively protrude from the circuit board 131.

In addition, as described above, the positive electrode tab 133, the negative electrode tab 134, the circuit device 135, the positive terminal 136a, and the negative terminal 136b are located at the top surface of the circuit board 131. Particularly, because the positive electrode tab 133 and the negative electrode tab 134 are located at the top surface of the circuit board 131, they do not increase the thickness of the protective circuit module 130. In contrast, if the positive electrode tab 133 and the negative electrode tab 134 were located at the bottom surface of the circuit board 131, the thickness of the protective circuit module 130 may be increased by the thickness of the positive electrode tab 133 and the negative electrode tab 134. However, in the current embodiment, the positive electrode tab 133 and the negative electrode tab 134 are located at the top surface of the protective circuit module 130, and the positive electrode cell tab 112 and the negative electrode cell tab 113 are directly connected to the top surfaces of the positive electrode tab 133 and the negative electrode tab 134, so that the total thickness of the protective circuit module 130 does not increase. Therefore, the battery pack 100 can be slim.

Figure 5A:
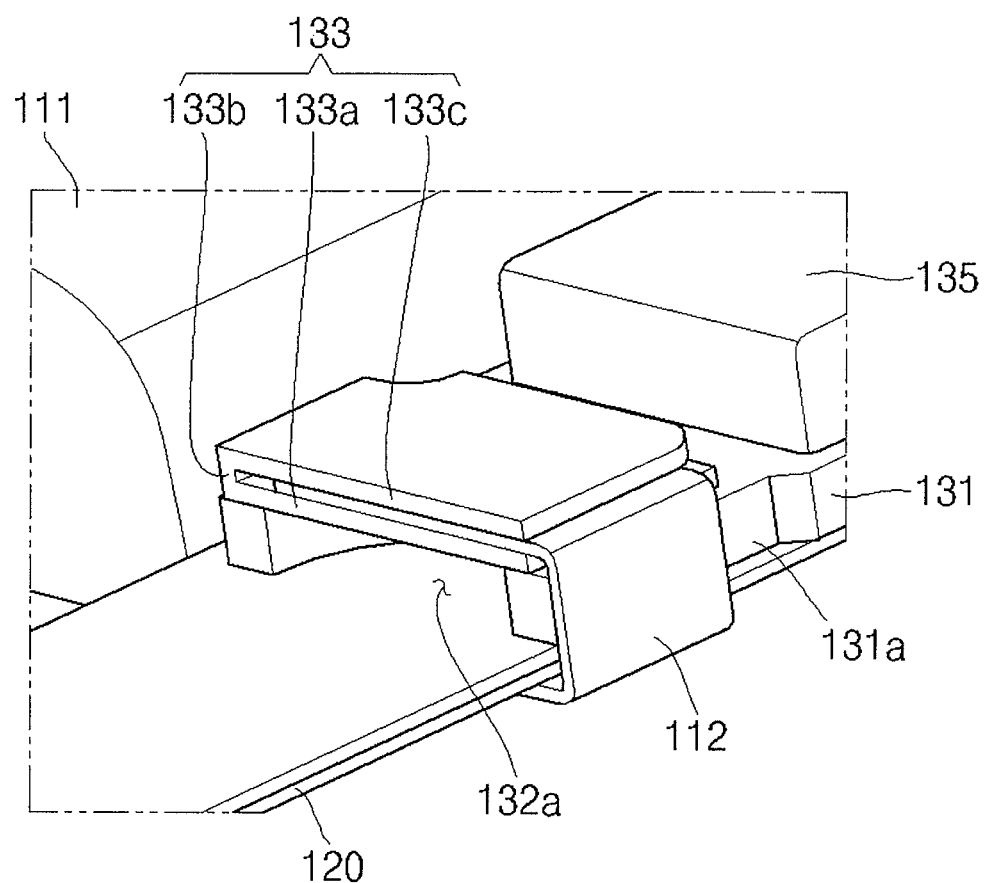
FIGS. 5a and 5b are a partial cut-away view and a partial side cut-away view, respectively, of the battery pack according to embodiments of the present invention.
Figure 5B:
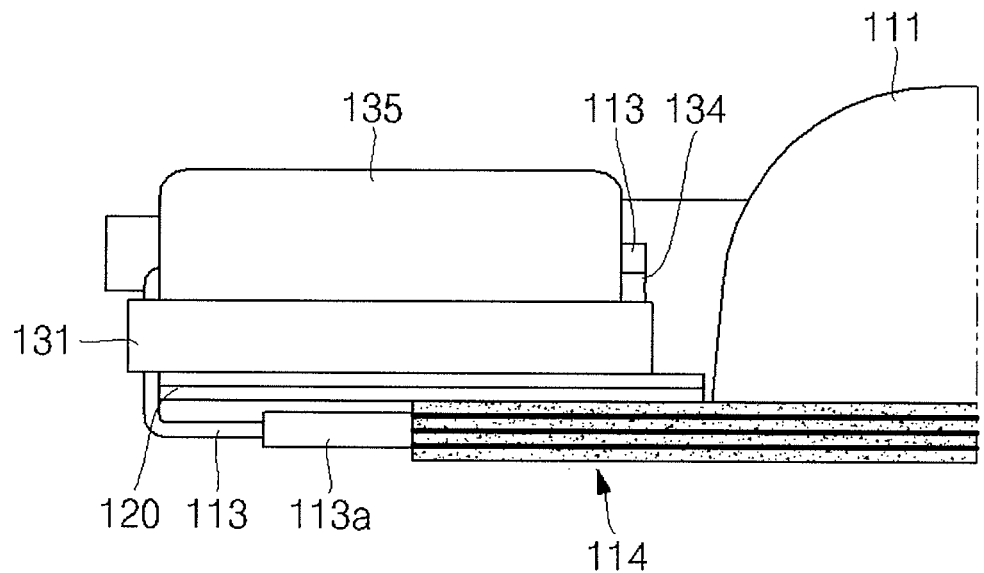
Figure 6A:
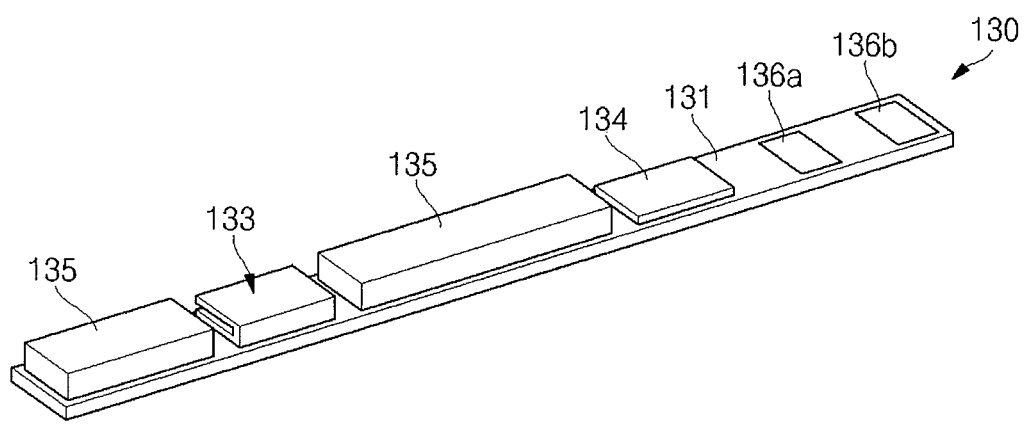
FIGS. 6a and 6b are a top perspective view and a bottom perspective view, respectively, of a protective circuit module of the battery pack according to embodiments of the present invention.
Figure 6B:
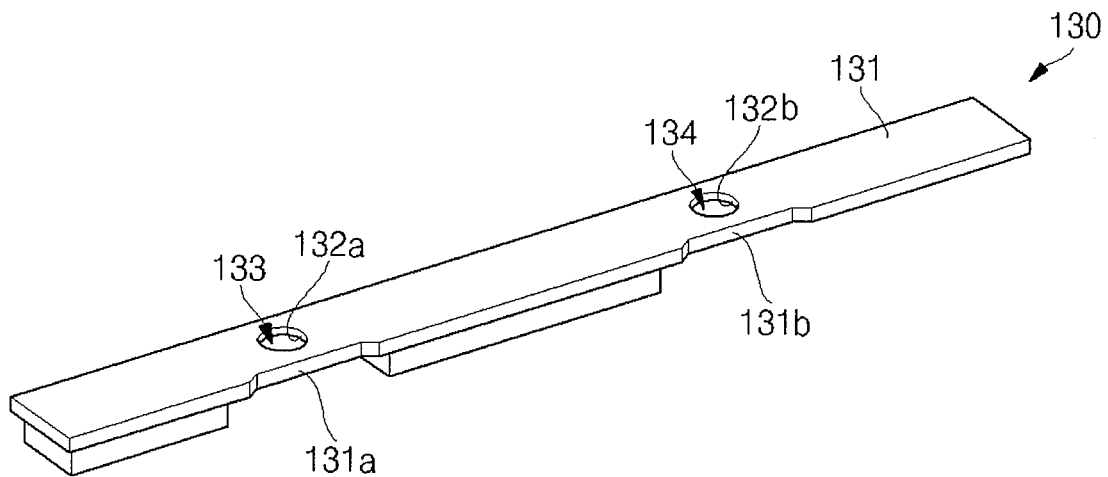

FIGS. 5a and 5b are a partial cut-away view and a partial side cut-away view illustrating the battery pack 100 according to embodiments, and FIGS. 6a and 6b are a top perspective view and a bottom perspective view, respectively, of the protective circuit module 130 of the battery pack 100 according to embodiments of the present invention.

Referring to FIGS. 5a, 5b, 6a, and 6b, holes 132a and 132b having a generally circular shape may be formed in the circuit board 131 at positions corresponding to the positive electrode tab 133 and the negative electrode tab 134. The shape of the holes 132a and 132b is not limited to a circular shape. The positive electrode tab 133 and the negative electrode tab 134 may cover at least a portion of the holes 132a and 132b. The widths of the positive electrode tab 133 and the negative electrode tab 134 may be greater than the diameters of the holes 132a and 132b such that the holes 132a and 132b are entirely covered with the positive electrode tab 133 and the negative electrode tab 134. When the positive electrode tab 133 and the positive electrode cell tab 112 are connected or the negative electrode tab 134 and the negative electrode cell tab 113 are connected, a connecting tool (e.g., a welding rod) is inserted into the hole 132a or 132b.

In detail, in one embodiment of the present invention, the first section 133a of the positive electrode tab 133 covers the hole 132a entirely. The first section 133a is connected to the second section 133b, and the third section 133c having a shape corresponding to the shape of the first section 133a is connected to the 133b. In addition, the positive electrode cell tab 112 is inserted between the first section 133a and the third section 133c. In this way, the positive electrode tab 133 and the positive electrode cell tab 112 are electrically connected to each other.

As described above, in the battery pack 100 of the current embodiment, the electrode taps 133 and 134 are located at a same side of the circuit board as the circuit device 135, and thus the thickness of the protective circuit module 130 is not increased by the electrode tabs 133 and 134 and the cell tabs 112 and 113. That is, because the circuit device 135 is substantially thicker than the electrode tabs 133 and 134 and the cell tabs 112 and 113, the thicknesses of the electrode tabs 133 and 134 and the cell tabs 112 and 113 do not extend beyond the thickness of the circuit device 135.

Furthermore, although sharp and pointed burrs are formed when the electrode tabs 133 and 134 are formed during a manufacturing process of the battery pack 100, the case 111 may not be damaged by the burrs because the electrode tabs 133 and 134 are located only at the top surface of the circuit board 131. If the electrode tabs 133 and 134 were located at the bottom surface of the circuit board 131, burrs of the electrode tabs 133 and 134 may penetrate the first insulating tape 120 and damage the case 111.

Figure 7:
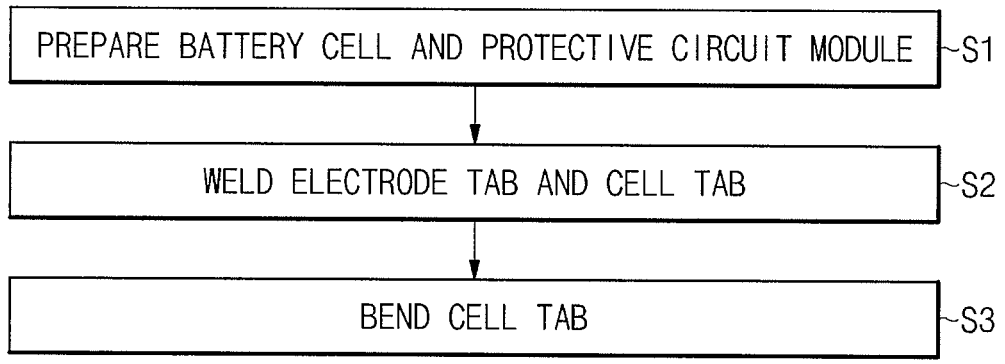
FIG. 7 is a flowchart of a method of manufacturing a battery pack according to an embodiment of the present invention.

FIG. 7 is a flowchart for explaining a method of manufacturing a battery pack according to one embodiment.

Referring to FIG. 7, in the current embodiment, a method of manufacturing a battery pack 100 includes: a battery cell and protective circuit module preparation operation S1; an electrode tab and cell tab connecting operation S2; and a cell tab bending operation S3. In addition, a second insulating tape attaching operation and a third insulating tap attaching operation may be further performed.

Figure 8A:
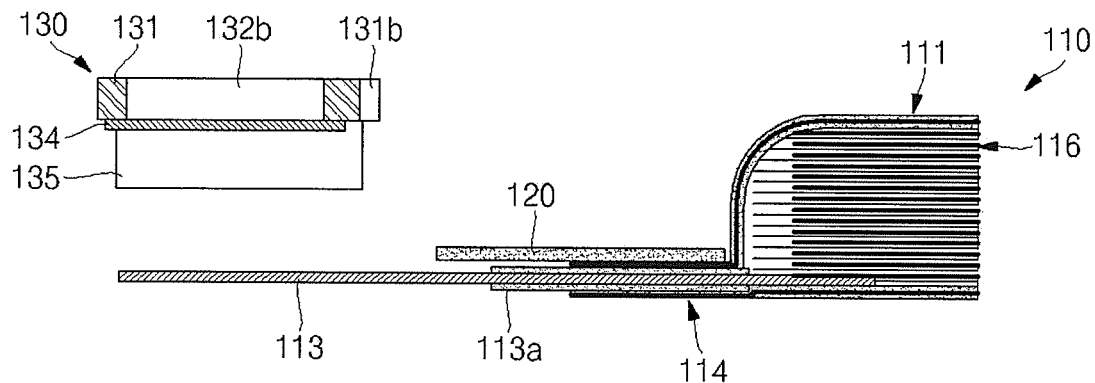
FIGS. 8a, 8b, and 8c are sectional views illustrating main operations of the battery pack manufacturing method according to embodiments of the present invention.
Figure 8B:
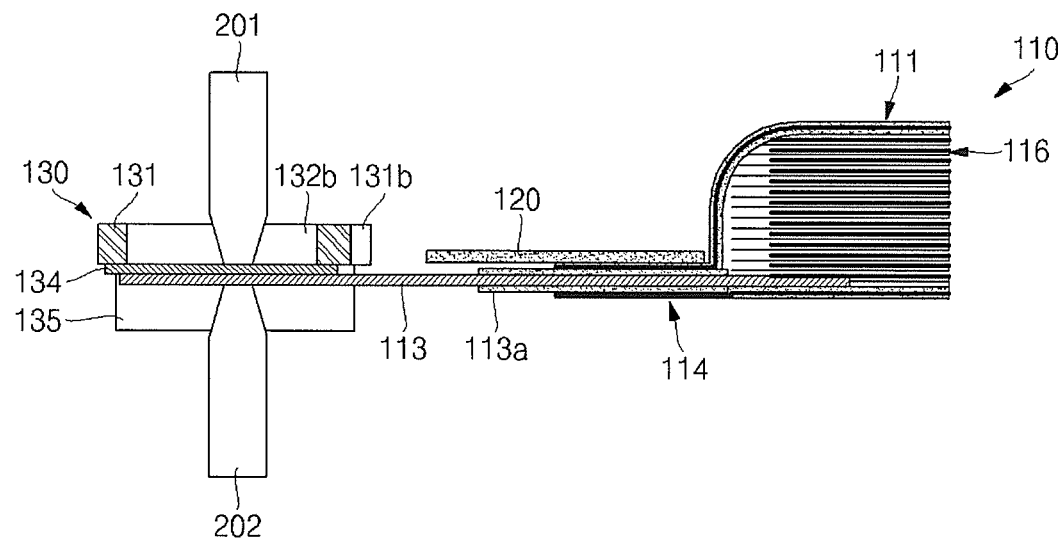
Figure 8C:
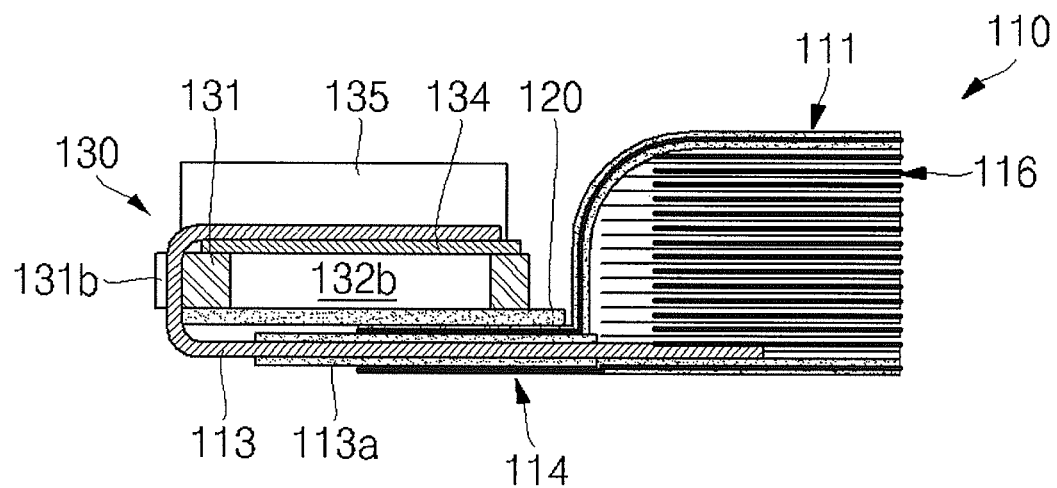

FIGS. 8a, 8b, and 8c are sectional views for explaining main operations of the battery pack manufacturing method according to one embodiment of the present invention.

Referring to FIG. 8a, in the battery cell and protective circuit module preparation operation S1, a rechargeable battery cell 110 and a protective circuit module 130 having a overcharging/over-discharging protection function are prepared.

The battery cell 110 includes: a case 111 having a lip 114; an electrode assembly 116; and a positive electrode cell tab 112 and a negative electrode cell tab 113, which are connected to the electrode assembly 116 and extend outward through the lip 114. Initially, the positive electrode cell tab 112 and the negative electrode cell tab 113 have a planar shape and are not bent. In FIG. 8a, only the negative electrode cell tab 113 is illustrated for conciseness. The negative electrode cell tab 113 is wrapped in an insulating tape 113a and is inserted through the lip 114. In addition, a first insulating tape 120 may be previously disposed on the lip 114 so as to prevent an electrical short circuit between the protective circuit module 130 and the case 111. Alternatively, the first insulating tape 120 may be disposed on the lip 114 after the electrode tab and cell tab connecting operation S2 or the cell tab bending operation S3.

The protective circuit module 130 includes: a circuit board 131 having one or more holes 132a and 132b; a positive electrode tab 133 and a negative electrode tab 134 at least partially covering the holes 132a and 132b; and at least one circuit device 135. In FIG. 8a, only the hole 132b and the negative electrode tab 134 are illustrated for conciseness. In addition, a positive terminal 136a, a negative terminal 136b, and a power line 137 may be further located at the circuit board 131; however, they are not illustrated in FIG. 8a for conciseness. Furthermore, a cutout groove 131b may be formed in the circuit board 131 so that the negative electrode cell tab 113 can pass through the cutout groove 131b after the negative electrode cell tab 113 is bent.

Referring to FIG. 8b, in the electrode tab and cell tab connecting operation S2, an electrode tab and a cell tab are connected to each other. For example, the negative electrode tab 134 and the negative electrode cell tab 113 are welded to each other. For this operation, first, a first welding rod 201 is brought into contact with the negative electrode tab 134 which is upwardly exposed through the hole 132b of the circuit board 131. Concurrently, a second welding rod 202 is brought into contact with the negative electrode cell tab 113. Next, different voltages are applied to the first welding rod 201 and the second welding rod 202, and concurrently, the first welding rod 201 and the second welding rod 202 are pressed together so as to couple the negative electrode tab 134 and the negative electrode cell tab 113 by resistance welding. That is, in one embodiment, a large amount of current instantaneously flows between the first welding rod 201 and the second welding rod 202 so that the negative electrode tab 134 and the negative electrode cell tab 113 that are brought into contact with each other are partially melted and welded. Generally, resistance welding is performed when two parts are of the same material. Thus, both the negative electrode tab 134 and the negative electrode cell tab 113 may be both formed of nickel or another material appropriate for good resistance welding.

Referring to FIG. 8c, in the cell tab bending operation S3, the negative electrode cell tab 113 is bent so that the protective circuit module 130 can be placed above the lip 114. That is, the negative electrode cell tab 113 is bent in a generally ⊂-shape (or C-shape) so as to place the protective circuit module 130 on the first insulating tape 120 that is located at the lip 114. Because the negative electrode cell tab 113 is inserted into the cutout groove 131b formed in the circuit board 131, the negative electrode cell tab 113 does not excessively protrude from the circuit board 131. In addition, due to the cell tab bending operation S3, the negative electrode tab 134 and the circuit device 135 can be placed at the top surface of the circuit board 131 of the protective circuit module 130. In addition, the negative electrode cell tab 113 is placed at the top surface of the negative electrode tab 134 in a welded state.

Furthermore, after the cell tab bending operation S3, both lateral surfaces of the case 111 and the protective circuit module 130 may be covered with the second insulating tapes 140, and the protective circuit module 130 and the lip 114 may be covered with a third insulating tape 150. As shown in FIG. 2, the power line 137 of the protective circuit module 130 may extend to the outside through a hole 151 of the third insulating tape 150.

As described above, according to the method of manufacturing the battery pack 100 of the current embodiment, because there is a hole through the circuit board 131, a welding rod can be easily brought into contact with an electrode tab opposing a cell tab. Therefore, the electrode tab and the cell tab can be easily welded together at the circuit board 131 without having to extend or protrude the electrode tab to the outside of the circuit board 131.

Furthermore, according to the method of manufacturing of the battery pack 100 of the current embodiment, because an end of at least one cell tab is welded to at least one electrode tab located at the top surface of the circuit board 131, the at least one cell tab and the at least one electrode tab do not increase the thickness of the protective circuit module 130. That is, because the circuit device 135 is thicker than the at least one cell tab and the at least one electrode tab and because the at least one cell tab and the at least one electrode tab are located at the same surface of the circuit board 131 as the circuit device 135, the thickness of the protective circuit module 130 is not increased due to the at least one cell tab and the at least one electrode tab.

In addition, according to the method of manufacturing the battery pack 100 of the current embodiment, although burrs may be formed on an end of a cell tab, the case 111 is not damaged by the burrs because the at least one cell tab is placed at the top surface of the circuit board 131.

Figure 9:
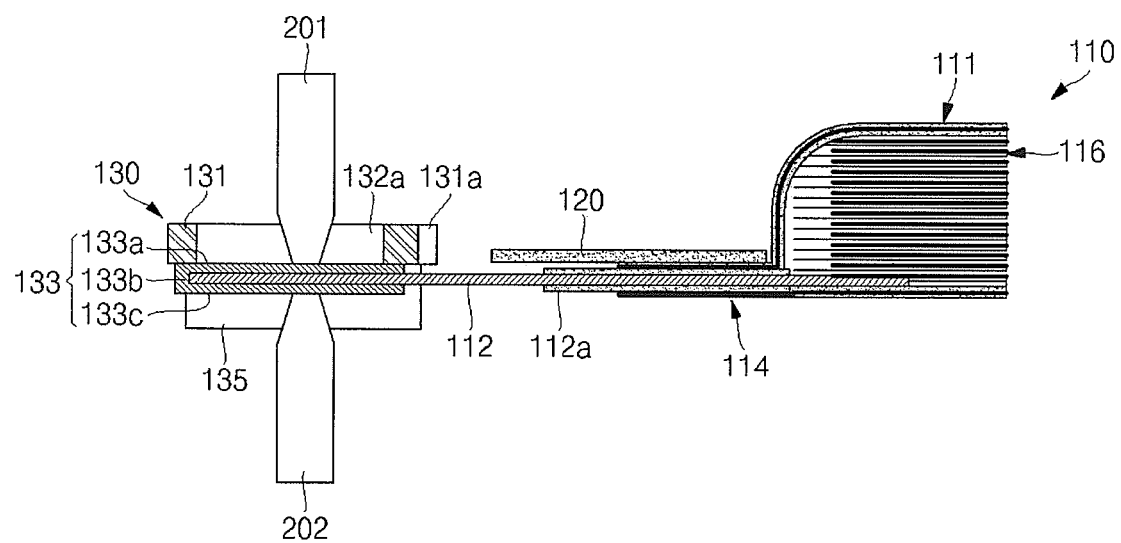
FIG. 9 is a sectional view illustrating main operations of the battery pack manufacturing method according to an embodiment of the present invention.

FIG. 9 is a sectional view for explaining the battery pack manufacturing method according to an embodiment of the present invention.

Referring to FIG. 9, a positive electrode tab 133 includes: a first section 133a attached to the circuit board 131; a second section 133b connected to an end of the first section 133a in a generally perpendicular direction; and a third section 133c connected to the second section 133b and generally parallel with the first section 133a. The first section 133a covers at least a portion of a hole 132a formed in the circuit board 131.

Before the electrode tab and cell tab connecting operation S2, an end of the positive electrode cell tab 112 is inserted between the first section 133a and the third section 133c. Next, a first welding rod 201 is brought into contact with the first section 133a exposed through the hole 132a of the circuit board 131. At the same time, a second welding rod 202 is brought into contact with the third section 133c. Next, different voltages (e.g., having opposite polarities) are applied to the first welding rod 201 and the second welding rod 202 so as to weld the positive electrode tab 133 to the positive electrode cell tab 112. That is, the first section 133a and the third section 133c of the positive electrode tab 133 are partially melted, thus welding the positive electrode tab 133 to the positive electrode cell tab 112.

The above-described electrode tab structure and welding method may be useful when an electrode tab and a cell tab are formed of different materials. For example, if the positive electrode tab 133 is formed of nickel and the positive electrode cell tab 112 is formed of aluminum, welding the positive electrode tab 133 and the positive electrode cell tab 112 using a conventional welding method results in a poor (or weak) weld. For example, the above-described method of welding the negative electrode tab 134 and the negative electrode cell tab 113 in reference to FIG. 8b is not applicable to a process of welding the positive electrode tab 133 and the positive electrode cell tab 112 because the two parts are formed of different materials. Due to characteristics of resistance welding, if the method of welding the negative electrode tab 134 to the negative electrode cell tab 113 was actually applied to a process of welding the positive electrode tab 133 to the positive electrode cell tab 112, the positive electrode tab 133 and the positive electrode cell tab 112 would not be welded to each other although a hole would be formed by a welding rod through the positive electrode cell tab 112 formed of aluminum.

According to the current embodiment, however, the positive electrode tab 133 formed of nickel includes the first section 133a and the third section 133c, and the positive electrode cell tab 112 formed of aluminum is inserted between the first section 133a and the third section 133c. Then, the first welding rod 201 is brought into contact with the first section 133a formed of nickel, and the second welding rod 202 is brought into contact with the third section 133c formed of nickel. Thus, only the first section 133a and the third section 133c are partially melted and are welded to the positive electrode cell tab 112.

After operation S2, the positive electrode cell tab 112 and the negative electrode cell tab 113 are bent as described above, so as to place the protective circuit module 130 on the first insulating tape 120 that is placed on the lip 114. Concurrently, the negative electrode cell tab 113 is also bent. That is, the positive electrode cell tab 112 and the negative electrode cell tab 113 are bent together to place the protective circuit module 130 on the first insulating tape 120.

As described above, according to the battery pack manufacturing method of the current embodiment, welding is performed after inserting the positive electrode cell tab 112 made of aluminum between the first section 133a and the third section 133c of the positive electrode tab 133 made of nickel, so that the positive electrode tab 133 made of nickel can be welded to the positive electrode cell tab 112 made of aluminum. As explained above, generally, the positive electrode cell tab 112 made of aluminum and the positive electrode tab 133 made of nickel are poorly welded. Therefore, in the current embodiment, the positive electrode tab 133 is configured to have a first section 133a, a second section 133b, and a third section 133c, and the first section 133a and the third section 133c are concurrently welded to the positive electrode cell tab 112 by partially melting the first section 133a and the third section 133c. In this way, the positive electrode cell tab 112 made of aluminum and the positive electrode tab 133 made of nickel can be welded to each other.

As described above, according to the embodiments, the at least one electrode tab and the at least one cell tab are connected to a surface of the protective circuit module where the circuit device is located, so that the thickness of the protective circuit module can be reduced or minimized.

Furthermore, according to the embodiments, because the electrode tab is located at the top surface of the protective circuit module, although the burrs are formed on the electrode tab, the case is not damaged by the burrs.

Moreover, according to the embodiments, a hole is formed so that a welding tool can be easily brought to contact the electrode tab, and thus the at least one electrode tab and the at least one cell tab can be easily connected.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims, and their equivalents.

What is claimed is:

1. A battery pack comprising:
 a battery cell comprising a case and at least one cell tab, the case comprising a lip, the at least one cell tab protruding through the lip; and a protective circuit module comprising a circuit board located at a top side of the lip, at least one electrode tab located at a top surface of the circuit board, and at least one circuit device located at the circuit board, the top side of the lip and the top surface of the circuit board facing a same direction, wherein a cell tab of the at least one cell tab comprises a first portion protruding through the lip to an outside of the case in a first direction substantially parallel to the top surface of the circuit board, and a second portion at the outside of the case, the second portion being bent relative to the first portion and extending in a second direction opposite the first direction and substantially parallel to the top surface of the circuit board, and wherein the second portion of the cell tab is connected to an electrode tab of the at least one electrode tab at the top surface of the circuit board.

2. A battery pack comprising:

a battery cell comprising a case and at least one cell tab, the case comprising a lip including a bottom surface and a top surface spaced apart from the bottom surface in a first direction, a cell tab of the at least one cell tab comprising a first portion protruding through the lip to an outside of the case in a second direction substantially perpendicular to the first direction, and a second portion at the outside of the case, the second portion being bent relative to the first portion and extending in a third direction opposite the second direction; and a protective circuit module comprising a circuit board located at a top side of the lip, at least one electrode tab located at a top surface of the circuit board, and at least one circuit device located at the circuit board, the top side of the lip and the top surface of the circuit board facing a same direction, wherein the second portion of the cell tab is connected to an electrode tab of the at least one electrode tab, wherein the circuit board has at least one hole, and wherein the electrode tab covers at least a portion of a hole of the at least one hole.

3. The battery pack of claim 2, wherein the electrode tab has a width greater than that of the hole.

4. The battery pack of claim 1, wherein the at least one circuit device is located at the top surface of the circuit board.

5. The battery pack of claim 1, wherein the at least one electrode tab has a width less than or equal to that of the circuit board.

6. The battery pack of claim 1, wherein the at least one electrode tab has a planar plate shape.

7. The battery pack of claim 1, wherein the at least one electrode tab comprises;

a first section connected to the circuit board;

a second section perpendicularly connected to the first section; and a third section connected to the second section and substantially parallel with the first section.

8. The battery pack of claim 7, wherein the at least one cell tab is located between the first section and the third section of the at least one electrode tab.

9. The battery pack of claim 1, wherein the circuit board has at least one cutout groove at a position corresponding to a location of the at least one cell tab.

10. The battery pack of claim 1, wherein a bottom surface of the lip is coplanar with a bottom surface of the case, and wherein a top surface of the lip is closer to a plane of the bottom surface of the lip and the bottom surface of the case than a top surface of the case.

11. The battery pack of claim 1, further comprising a first insulating tape located between the lip and the circuit board.

12. The battery pack of claim 1, wherein both lateral sides of the battery cell and the protective circuit module are covered with second insulating tapes.

13. The battery pack of claim 1, wherein at least a portion of a top side of the battery cell and the protective circuit module are covered with a third insulating tape.

* * * * *